US008922428B1

(12) United States Patent
Young et al.

(10) Patent No.: US 8,922,428 B1
(45) Date of Patent: Dec. 30, 2014

(54) APPARATUS AND METHOD FOR WRITING AND READING SAMPLES OF A SIGNAL TO AND FROM A MEMORY

(71) Applicant: Marvell International Ltd., Hamilton (BM)

(72) Inventors: Chi-Yuen Young, Hong Kong (HK); Mao Yu, San Jose, CA (US); Xiangdong Jin, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/968,791

(22) Filed: Aug. 16, 2013

Related U.S. Application Data

(63) Continuation of application No. 13/051,114, filed on Mar. 18, 2011, now Pat. No. 8,514,129.

(60) Provisional application No. 61/323,271, filed on Apr. 12, 2010.

(51) Int. Cl.
*G01S 19/35* (2010.01)

(52) U.S. Cl.
CPC .................................... *G01S 19/35* (2013.01)
USPC .................................................. 342/357.75

(58) Field of Classification Search
USPC .................. 342/357.75, 357.76, 357.77, 378
See application file for complete search history.

(56) References Cited

U.S. PATENT DOCUMENTS

| | | | |
|---|---|---|---|
| 5,357,606 A * | 10/1994 | Adams | 345/545 |
| 5,633,829 A | 5/1997 | Matsumura et al. | |
| 5,850,393 A | 12/1998 | Adachi | |
| 7,477,186 B2 * | 1/2009 | Camp, Jr. | 342/357.77 |
| 2005/0094677 A1 | 5/2005 | Lu et al. | |
| 2006/0218341 A1 | 9/2006 | Nolte et al. | |
| 2007/0080856 A1 | 4/2007 | Camp, Jr. | |
| 2011/0007783 A1 | 1/2011 | Weill | |
| 2011/0216857 A1 | 9/2011 | Gotman et al. | |

* cited by examiner

*Primary Examiner* — Harry Liu

(57) ABSTRACT

A system includes a memory with columns and rows. A sampler samples a first portion of a signal during first periods to obtain sets of samples, respectively. The sets of samples include a first set having first samples and a second set having second samples. A first controller writes each set in the sets of samples in a respective one of the columns. The first controller writes: the first samples in a first column such that each of the first samples is stored in a respective one of the rows; the second samples in a second column such that each of the second samples is stored in a respective one of the rows; and the second samples in the second column subsequent to writing the first samples in the first column. A second controller reads third samples stored in a first row and fourth samples stored in a second row.

20 Claims, 10 Drawing Sheets

APPARATUS AND METHOD FOR WRITING AND READING SAMPLES OF A SIGNAL TO AND FROM A MEMORY

CROSS-REFERENCE TO RELATED APPLICATIONS

The present disclosure is a continuation of U.S. patent application Ser. No. 13/051,114 (now U.S. Pat. No. 8,514,129), filed on Mar. 18, 2011. This application claims the benefit of U.S. Provisional Application No. 61,323,271 filed on Apr. 12, 2010. The entire disclosures of the applications referenced above are incorporated herein by reference

FIELD

The present disclosure relates generally to the field of signal processing. More particularly, the present disclosure relates to buffering techniques for samples of signals modulated with periodic waveforms.

BACKGROUND

Digital signal processing refers to the use of digital techniques to process signals. Before signals can be processed using digital signal processing techniques, the signals must first be converted to digital samples. The digital samples are generally stored in a buffer before processing, for example to account for differences between the rate of receiving the signals and the rate of processing the signals. A digital signal processor retrieves the digital samples from the buffer, and then processes the retrieved digital samples. FIG. 1 shows a conventional digital signal processing system 100. Referring to FIG. 1, a signal 102 is converted to digital samples 104 by a sampler 106. Digital samples 104 are stored in a buffer 108. A digital signal processor (DSP) 110 retrieves digital samples 104, and then processes retrieved digital samples 104.

According to conventional buffering techniques, digital samples 104 are generally stored in buffer 108 in row order. That is, a contiguous group of sequential samples 104 is stored at a single address in buffer 108, where each address uniquely identifies a row in buffer 108. When processing signals modulated with a periodic waveform, it is often desirable to integrate the signal by combining samples separated by one or more periods. In such applications, sampling rates and memory width are generally chosen so that one row of samples corresponds to one period of the periodic waveform. FIG. 2 illustrates this technique for a buffer 200 and a waveform period of 1 ms.

Referring to FIG. 2, a respective 1 ms group of samples is stored at each address of buffer 200, and successive groups are stored at respective successive addresses. Therefore each row of buffer 200 stores exactly one period of samples of the periodic waveform. A digital signal processor retrieves the samples from buffer 200 in row order for processing. Because each row corresponds to one period, the samples are integrated by operating upon multiple rows. For example, the digital signal processor integrates corresponding samples in multiple rows to obtain an integration result. For many applications this buffering technique is adequate. However, at high frequencies and/or sampling rates, this integration process is too slow to keep up with the incoming signal.

SUMMARY

A system is provided that includes a memory, a sampler, a first controller, and a second controller. The memory includes columns and rows. The sampler is configured to sample a first portion of a signal during first periods to obtain sets of samples, respectively. The sets of samples include (i) a first set having first samples, and (ii) a second set having second samples. The first controller is configured to write each set in the sets of samples in a respective one of the columns.

The first controller is also configured to: write the first samples in a first column of the memory such that each of the first samples is stored in a respective one of the rows; write the second samples in a second column of the memory such that each of the second samples is stored in a respective one of the first rows; and write the second samples in the second column of the memory subsequent to the writing of the first samples in the first column of the memory. The second controller is configured to, subsequent to the first controller writing the first samples and the second samples in the memory, read (i) third samples stored in a first row of the memory, and (ii) fourth samples stored in a second row of the memory.

In other features, a method is provided and includes sampling a first portion of a signal during first periods to obtain sets of samples, respectively. The sets of samples include (i) a first set having first samples, and (ii) a second set having second samples. Each set in the sets of samples is written in a respective one of columns of a memory. The first samples are written in a first column of the memory such that each of the first samples is stored in a respective one of rows of the memory. The second samples are written in a second column of the memory such that each of the second samples is stored in a respective one of the rows. The second samples are written in the second column of the memory subsequent to the writing of the first samples in the first column of the memory. Subsequent to writing the first samples and the second samples in the memory, reading (i) third samples stored in a first row of the memory, and (ii) fourth samples stored in a second row of the memory.

In general, in one aspect, an embodiment features an apparatus comprising: a sampler configured to sample a signal, wherein the signal is modulated with a waveform having a known period, wherein the sampler obtains K samples in each period, and wherein each of the samples is N bits long, wherein K is an integer greater than 0, and N is an integer greater than 1; a memory bank, wherein the memory bank has M columns and K rows, wherein each column is N bits wide, and wherein M is an integer greater than 0; a write controller configured to write the samples to the memory bank in column order; a read controller configured to read the samples from the memory bank in row order; and an integrator configured to integrate the samples read from the memory bank, wherein the integrator provides a respective integration result for each row.

Embodiments of the apparatus can include one or more of the following features. In some embodiments, the memory bank is a first memory bank, and the apparatus further comprises: a first buffer comprising the first memory bank; and a second buffer comprising a second memory bank, wherein the second memory bank has M columns and K rows, and wherein each column of the second memory bank is N bits wide; wherein the first memory controller writes K×M consecutive samples to the first memory bank in column order, and writes the following K×M consecutive samples to the second memory bank in column order; and wherein the second memory controller reads the samples from the first and second memory banks in row order. In some embodiments, the waveform is a first waveform, the apparatus further comprises: a correlator configured to correlate the integration results with a second waveform, wherein the second waveform represents a pseudorandom number. Some embodiments comprise a transmitter identification module configured to determine an identity of a transmitter of the signal based on an output of the correlator. Some embodiments comprise a location module configured to determine a location of the apparatus based on the identity of the transmitter. Some embodiments comprise a receiver configured to receive the signal. Some embodiments comprise a device comprising the apparatus. In some embodiments, the signal is a global positioning system (GPS) signal.

In general, in one aspect, an embodiment features a method comprising: sampling a signal, wherein the signal is modulated with a waveform having a known period, wherein K samples are obtained in each period, wherein each of the samples is N bits long, and wherein K is an integer greater than 0, and N is an integer greater than 1; writing the samples to a memory bank in column order, wherein the memory bank has M columns and K rows, wherein each column is N bits wide, and wherein M is an integer greater than 0; reading the samples from the memory bank in row order; and integrating the samples read from the memory bank, wherein the integrating provides a respective integration result for each row.

Embodiments of the method can include one or more of the following features. In some embodiments, the memory bank is a first memory bank in a first buffer, and the method further comprises: writing K×M consecutive samples to the first memory bank in column order; writing the following K×M consecutive samples in column order to a second memory bank in a second buffer, wherein the second memory bank has M columns and K rows, and wherein each column of the second memory bank is N bits wide; and reading the samples from the first and second memory banks in row order. In some embodiments, the waveform is a first waveform, and the method further comprises: correlating the integration results with a second waveform, wherein the second waveform represents a pseudorandom number. Some embodiments comprise determining an identity of a transmitter of the signal based on an output of the correlator. Some embodiments comprise determining a location of a device based on the identity of the transmitter. In some embodiments, the signal is a global positioning system (GPS) signal.

In general, in one aspect, an embodiment features non-transitory computer-readable media embodying instructions executable by a computer to perform functions comprising: writing samples of a signal to a memory bank in column order, wherein the signal is modulated with a waveform having a known period, wherein K samples exist for each period, wherein each of the samples is N bits long, wherein the memory bank has M columns and K rows, wherein each column is N bits wide, and wherein K is an integer greater than 0, N is an integer greater than 1, and M is an integer greater than 0; reading the samples from the memory bank in row order; and integrating the samples read from the memory bank, wherein the integrating provides a respective integration result for each row.

Embodiments of the non-transitory computer-readable media can include one or more of the following features. In some embodiments, the memory bank is a first memory bank in a first buffer, and the functions further comprise: writing K×M consecutive samples to the first memory bank in column order; writing the following K×M consecutive samples in column order to a second memory bank in a second buffer, wherein the second memory bank has M columns and K rows, and wherein each column of the second memory bank is N bits wide; and reading the samples from the first and second memory banks in row order. In some embodiments, the waveform is a first waveform, and the functions further comprise: correlating the integration results with a second waveform, wherein the second waveform represents a pseudorandom number. In some embodiments, the functions further comprise: determining an identity of a transmitter of the signal based on an output of the correlator. In some embodiments, the functions further comprise: determining a location of a device based on the identity of the transmitter. In some embodiments, the signal is a global positioning system (GPS) signal.

The details of one or more implementations are set forth in the accompanying drawings and the description below. Other features will be apparent from the description and drawings, and from the claims.

Figure 1:
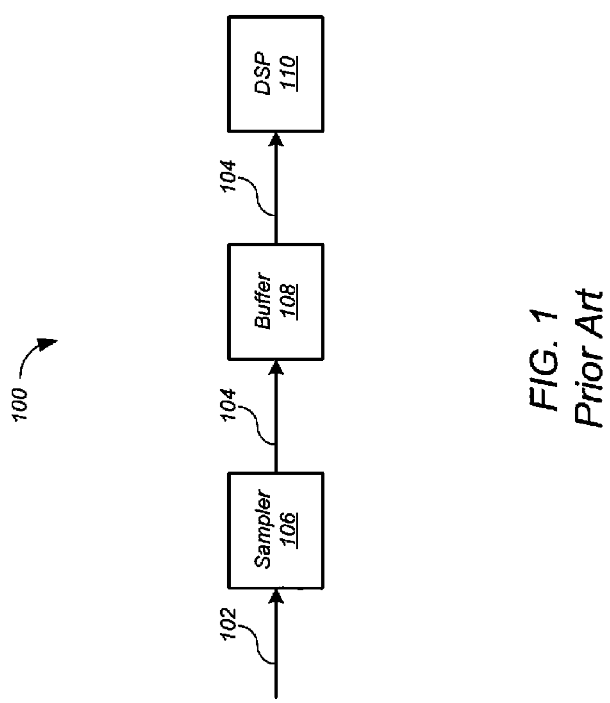
FIG. 1 shows a conventional digital signal processing system.
Figure 2:
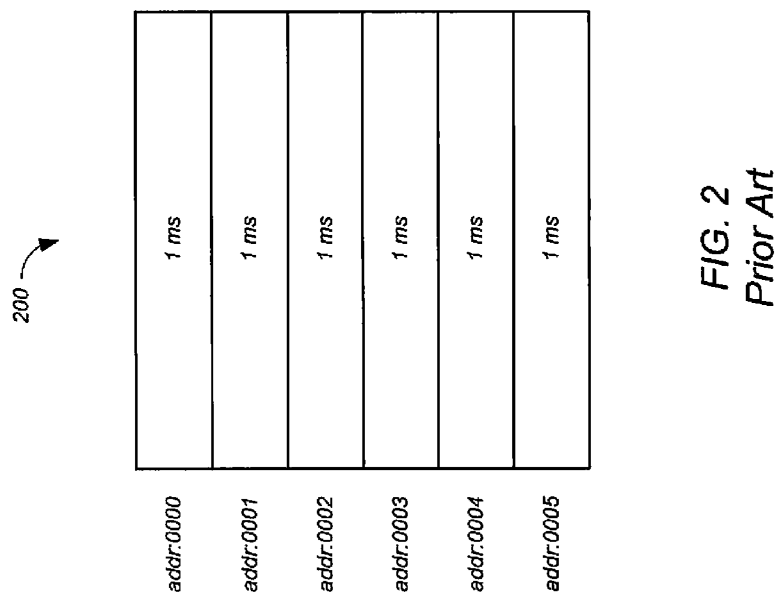
FIG. 2 illustrates a conventional buffering technique for the digital signal processing system of FIG. 1.

The leading digit(s) of each reference numeral used in this specification indicates the number of the drawing in which the reference numeral first appears.

DETAILED DESCRIPTION

Figure 3:
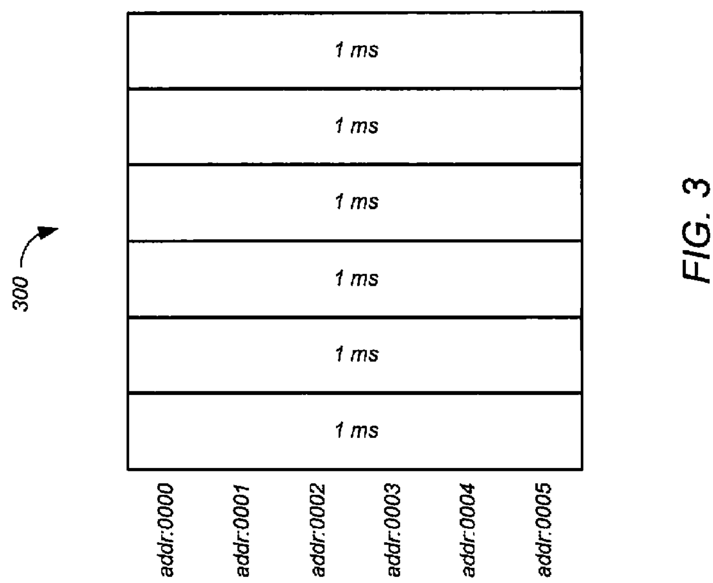
FIG. 3 illustrates a buffering technique according to one embodiment.

Embodiments of the present disclosure provide elements of buffering techniques for samples of signals modulated with periodic waveforms. According to these techniques, digital samples of a signal modulated with a periodic waveform are stored in a buffer in column order and retrieved from the buffer in row order, where each column of the buffer stores one period of the samples and each address uniquely identifies a row in the buffer. FIG. 3 illustrates this buffering technique according to one embodiment.

Referring to FIG. 3, a respective 1 ms group of samples is stored in each column of buffer 300, and successive groups are stored at respective successive columns. Therefore each column of buffer 300 stores exactly one period of samples of the periodic waveform. This technique places corresponding samples (that is, samples having the same phase with respect to the periodic waveform) from different periods within a single row in buffer 300. Therefore, a digital signal processor can perform integration upon data retrieved from a single address of buffer 300. In contrast, conventional techniques must retrieve, and operate upon, data from multiple addresses to perform an integration operation because corresponding samples from different periods are stored in different rows.

The described buffering techniques are suitable for applications featuring high frequencies and/or sampling rates, for example such as global positioning system (GPS) signals and the like. However, while the disclosed embodiments are described in terms of GPS signals, the disclosed techniques are not limited to GPS signals, and can be used with other sorts of signals that are modulated with waveforms having known periods.

Figure 4:
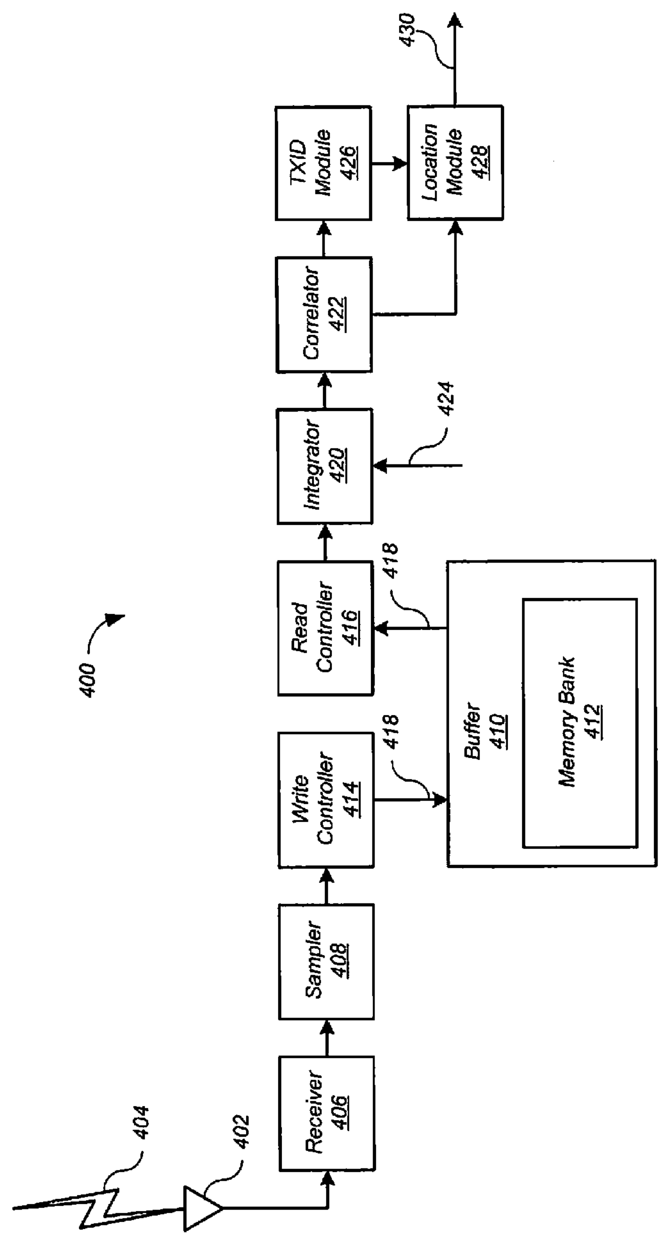
FIG. 4 shows elements of a digital signal processing system according to an online embodiment.

FIG. 4 shows elements of a digital signal processing system 400 according to an online embodiment. The embodiment of FIG. 4 is referred to as "online" because it is suitable for processing GPS signals as they are received. However, this online embodiment can also be used in an "offline" mode to process a set of GPS signals after the entire set has been received and stored. Although in the described embodiments the elements of digital signal processing system 400 are presented in one arrangement, other embodiments may feature other arrangements. For example, elements of digital signal processing system 400 can be implemented in hardware, software, or combinations thereof.

Referring to FIG. 4, digital signal processing system 400 includes an antenna 402 configured to obtain a GPS signal 404, a receiver 406 configured to receive GPS signal 404, a sampler 408 configured to sample signal 404, and a buffer 410 that includes one or more memory banks 412. Digital signal processing system 400 also includes a write controller 414 configured to write samples 418 to memory bank 412 in column order, and a read controller 416 configured to read samples 418 from memory bank 412 in row order. Digital signal processing system 400 also includes an integrator 420 configured to integrate samples 418 read from memory bank 412, a correlator 422 configured to correlate the results of the integration with a reference waveform 424, a transmitter identification (TXID) module 426 configured to determine an identity of a transmitter of GPS signal 404 based on an output of correlator 422, and a location module 428 configured to determine a location 430 of digital signal processing system 400 based on the identity of the transmitter. Some or all of integrator 420, correlator 422, transmitter identification module 426, and location module 428 can be implemented as a digital signal processor. Some or all of the elements of digital signal processing system 400 can be implemented within a device such as a GPS receiver, smart phone, or the like.

Figure 5:
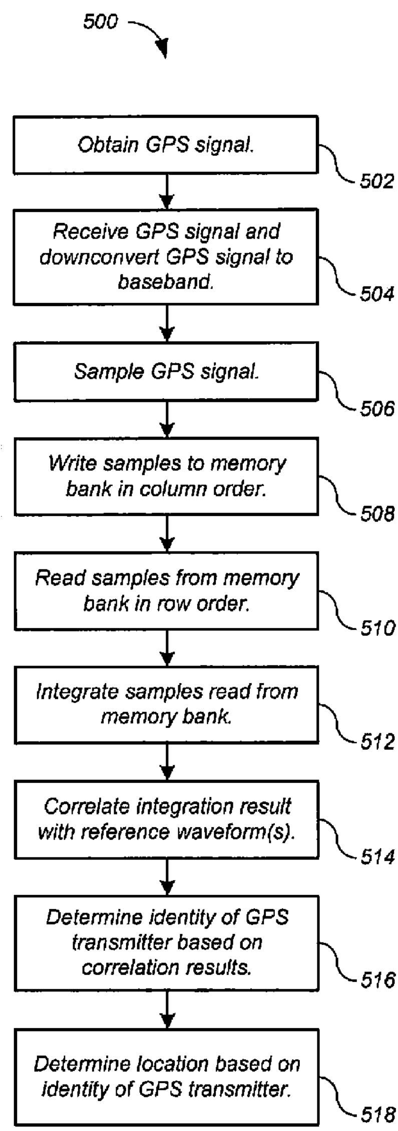
FIG. 5 shows a process for the digital signal processing system of FIG. 4 according to one embodiment.

FIG. 5 shows a process 500 for digital signal processing system 400 of FIG. 4 according to one embodiment. Although in the described embodiments the elements of process 500 are presented in one arrangement, other embodiments may feature other arrangements. For example, in various embodiments, some or all of the elements of process 500 can be executed in a different order, concurrently, and the like.

Referring to FIGS. 4 and 5, at 502 antenna 402 obtains GPS signal 404. At 504 receiver 406 receives GPS signal 404, and downconverts GPS signal 404 to baseband. At 506 sampler 408 samples GPS signal 404. GPS signal 404 is modulated with a pseudonoise code, which is a waveform having a known period. Sampler 408 obtains K digital samples in each period of GPS signal 404, where K is an integer greater than 0. In one embodiment, the period is 1 ms and the sampling frequency is 2.048 MHz, yielding K=2048. Each of the samples is N bits long, where N is an integer greater than 1. In one embodiment, each sample includes 2 in-phase bits and 2 quadrature-phase bits, yielding N=4. In another embodiment, each sample includes 3 in-phase bits and 3 quadrature-phase bits, yielding N=6. Of course, other values for N and K can be used instead.

Figure 6:
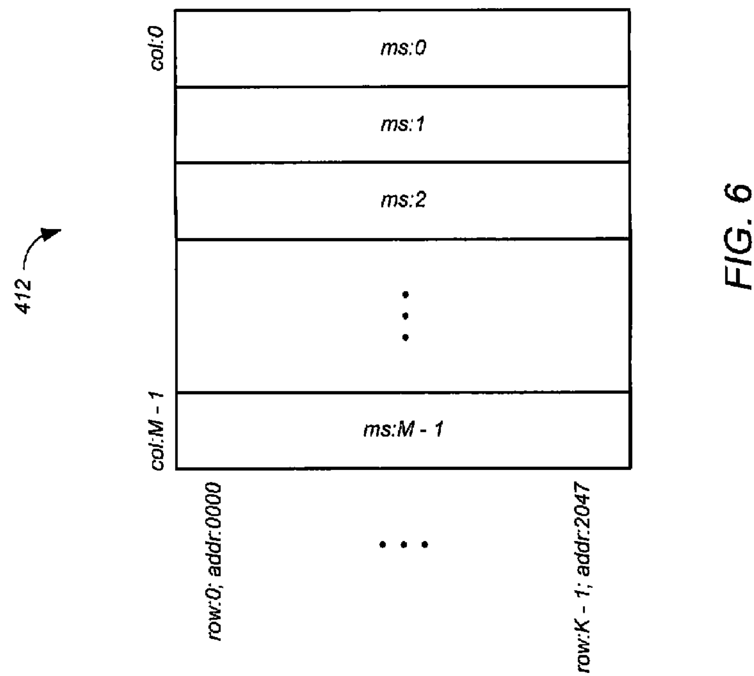
FIG. 6 illustrates a write operation for the digital signal processing system of FIG. 4.

At 508 write controller 414 writes samples 418 to memory bank 412 in column order. FIG. 6 illustrates the operation for a memory bank 412 having M columns and K rows, where each column is N bits wide. Referring to FIG. 6, memory bank 412 has K=2048 addresses. Each address identifies one row. Each row is capable of storing M samples, where M is an integer greater than 0. Write controller 414 writes a respective group of samples to each column, where the group represents one period of the pseudonoise code. In the example of FIG. 6, the period is 1 ms. For example, write controller 414 writes the first 1 ms of samples (ms:0) to column 0, the next ms of samples (ms:1) to column 1, and so on. Buffer 410 is implemented as a circular buffer, so that after writing the last column (column M−1), write controller 414 writes column 0 again. To write samples to a single column of a memory bank 412, write controller 414 employs a data mask or the like, thereby leaving data in the other columns unchanged.

Referring again to FIGS. 4 and 5, at 510 read controller 416 reads samples 418 from memory bank 412 in row order. In the example of FIG. 6, read controller 416 reads M samples from one address of memory bank 412. Each sample is N bits long.

At 512, integrator 420 integrates the M samples read from memory bank 412, and provides a respective integration result. At 514, correlator 422 correlates the integration result with one or more reference waveforms 424. Each reference waveform 424 represents a pseudorandom number. Correlator 422 provides a correlation result for each reference waveform 424. At 516 transmitter identification module 426 determines an identity of a transmitter of GPS signal 404 based on the correlation results. For example, transmitter identification module 426 identifies the pseudorandom number used to modulate GPS signal 404 based on correlation peaks in the correlation result, and identifies the GPS transmitter using the pseudorandom number. The GPS transmitter can be a GPS satellite, a GPS pseudolite, or the like. At 518, location module 428 determines a location of digital signal processing system 400 based on the identity of the GPS transmitter. For example, location module 428 employs a pseudorange and location for the GPS transmitter to determine the location.

Figure 7:
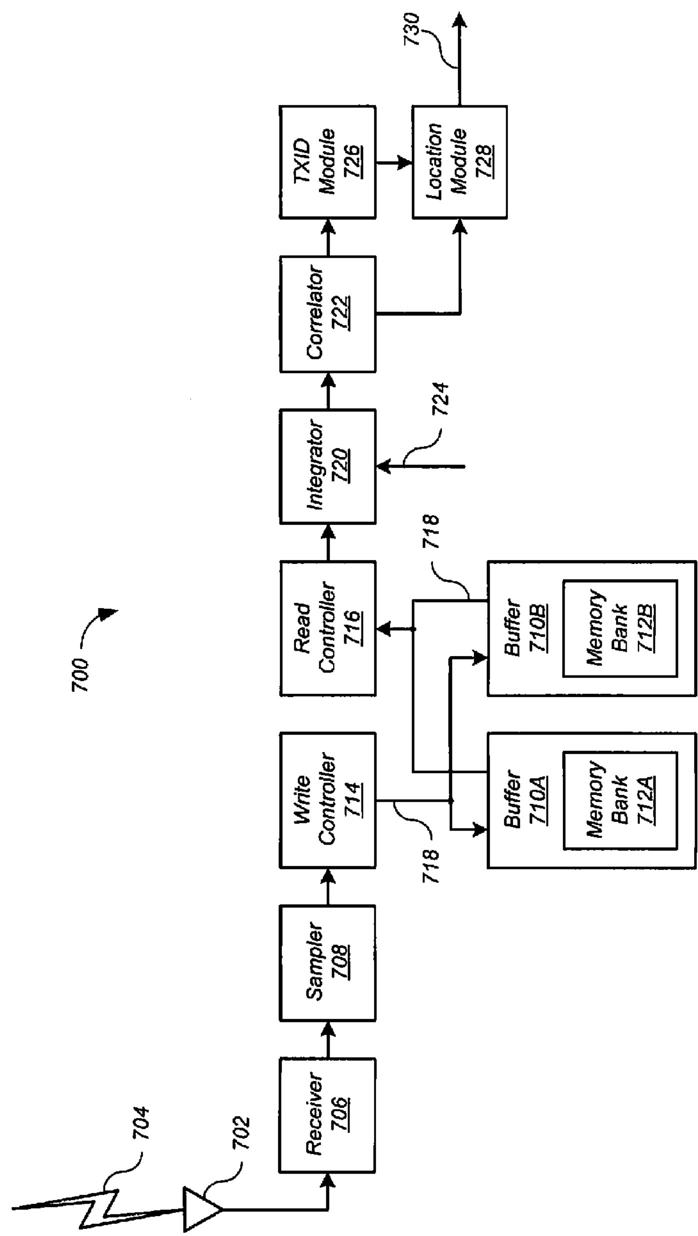
FIG. 7 shows elements of a digital signal processing system according to an online embodiment.

FIG. 7 shows elements of a digital signal processing system 700 according to an online embodiment. Although in the described embodiments the elements of digital signal processing system 700 are presented in one arrangement, other embodiments may feature other arrangements. For example, elements of digital signal processing system 700 can be implemented in hardware, software, or combinations thereof.

The embodiment of FIG. 7 is referred to as "offline" because it is suitable for processing a set of GPS signals after the entire set has been received and stored. Offline embodiments are particularly useful when a large number of samples are to be processed. For example, while an online embodiment could be used for up to 30 ms of samples, an offline embodiment is required for 120 ms of samples, assuming a sampling rate of 2.048 MHz. In such embodiments, the amount of data to be stored is too large for one memory bank. According to the offline embodiments disclosed herein, multiple buffers are employed, where each buffer includes one or more memory banks. The samples are written to the buffers in ping-pong fashion. That is, after filling one memory bank in a first buffer, the write controller writes the following samples to a memory bank in a second buffer. After filling that buffer, the write controller writes the following samples to a memory bank in the first buffer, and so on. Using buffers that are M samples wide, where M is not less than the number of samples in a single period of the periodic waveform, ensures that the read controller can read all of the samples in any single period in a single memory cycle.

Referring to FIG. 7, digital signal processing system 700 includes an antenna 702 configured to obtain a GPS signal 704, a receiver 706 configured to receive GPS signal 704, a sampler 708 configured to sample signal 704, and two buffers 710A and 710B. Each buffer 710 includes one or more memory banks 712A and 712B. Digital signal processing system 700 also includes a write controller 714 configured to write samples 718 to memory banks 712 in column order, and a read controller 716 configured to read samples 718 from memory banks 712 in row order. While an embodiment having only two buffers 710 is described, other embodiments can feature greater numbers of buffers 710.

Digital signal processing system 700 also includes an integrator 720 configured to integrate samples 718 read from memory bank 712, a correlator 722 configured to correlate the results of the integration with a reference waveform 724, a transmitter identification module 726 configured to determine an identity of a transmitter of GPS signal 704 based on an output of correlator 722, and a location module 728 configured to determine a location 730 of digital signal processing system 700 based on the identity of the transmitter. Some or all of integrator 720, correlator 722, transmitter identification module 726, and location module 728 can be implemented as a digital signal processor. Some or all of the elements of digital signal processing system 700 can be implemented within a device such as a GPS receiver, smart phone, or the like.

Figure 8:
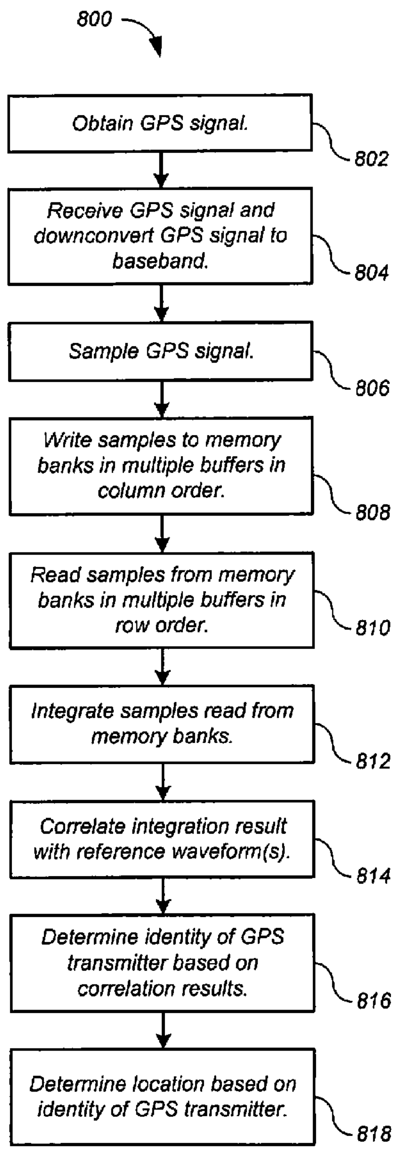
FIG. 8 shows a process for the digital signal processing system of FIG. 7 according to one embodiment.

FIG. 8 shows a process 800 for digital signal processing system 700 of FIG. 7 according to one embodiment. Although in the described embodiments the elements of process 800 are presented in one arrangement, other embodiments may feature other arrangements. For example, in various embodiments, some or all of the elements of process 800 can be executed in a different order, concurrently, and the like.

Referring to FIGS. 7 and 8, at 802 antenna 702 obtains GPS signal 704. At 804 receiver 706 receives GPS signal 704, and downconverts GPS signal 704 to baseband. At 806 sampler 708 samples GPS signal 704. GPS signal 704 is modulated with a pseudonoise code, which is a waveform having a known period. Sampler 708 obtains K digital samples in each period of GPS signal 704. In one embodiment, the period is 1 ms and the sampling frequency is 2.048 MHz, yielding K=2048. Each of the samples is N bits long. In one embodiment, each sample includes 2 in-phase bits and 2 quadrature-phase bits, yielding N=4. In another embodiment, each sample includes 3 in-phase bits and 3 quadrature-phase bits, yielding N=6. Of course, other values for N and K can be used instead.

Figure 9:
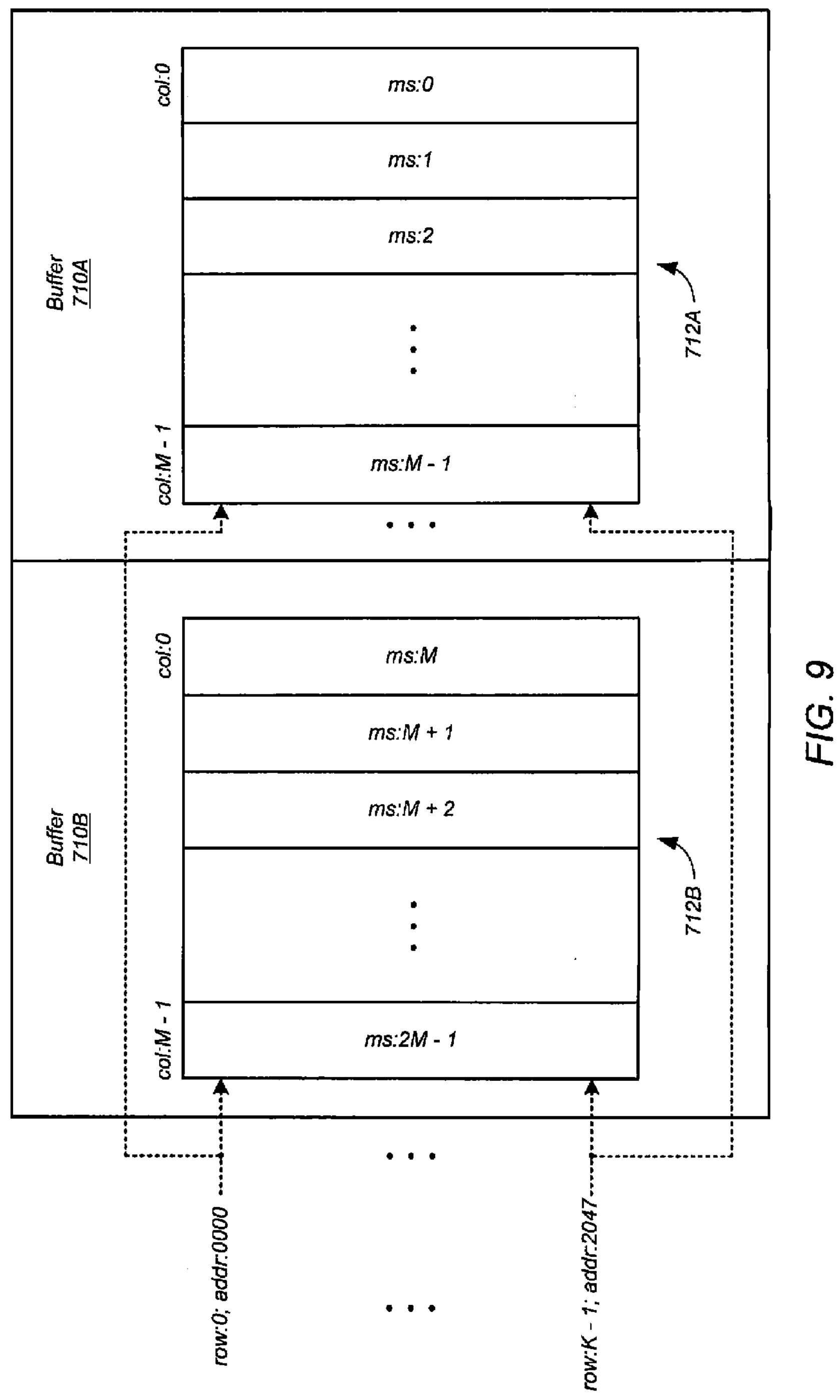
FIG. 9 illustrates a write operation for the digital signal processing system of FIG. 7.

At 808 write controller 714 writes samples 718 to memory banks 712 in multiple buffers 710 in column order. FIG. 9 illustrates the operation for memory banks 712 each having M columns and K rows, where each column is N bits wide. Referring to FIG. 9, each memory bank 712 has K=2048 addresses. Each address identifies one row in each buffer 710. Each row of a memory bank 712 is capable of storing M samples. Write controller 714 writes a respective group of samples to each column, where the group represents one period of the pseudonoise code. In the example of FIG. 9, the period is 1 ms. For example, write controller 714 writes the first 1 ms of samples (ms:0) to column 0, the next ms of samples (ms:1) to column 1, and so on. To write samples to a single column of a memory bank, write controller 714 employs a data mask or the like, thereby leaving data in the other columns unchanged.

Buffers 710 are employed in ping-pong fashion, so that after writing the last column (col:M−1) of a memory bank 712 in one buffer 710, write controller 714 writes to the first column (col:0) of a memory bank 712 in the other buffer 710. Buffers 710 are implemented together in a circular manner, so that after writing the last column in memory bank 712B of buffer 710B, write controller 714 returns to the first column of memory bank 712A.

Figure 10:
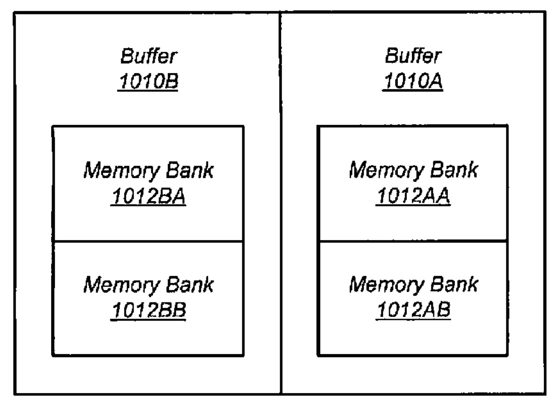
FIG. 10 illustrates a write operation for the digital signal processing system of FIG. 7 where each buffer includes multiple memory banks.

FIG. 10 illustrates this technique for an embodiment where each buffer 710 includes multiple memory banks 712. In such embodiments, the ping-pong approach is used until all of the memory banks 712 are filled before returning to the first memory bank 712. Referring to FIG. 10, two buffers 1010A and 1010B are shown. Buffer 1010A includes two memory banks 1012AA and 1012AB. Buffer 1010B includes two memory banks 1012BA and 1012BB. Write controller 714 writes memory banks 1012 in the following order: 1012AA, 1012BA, 1012AB, 1012BB, 1012AA, and so on.

Referring again to FIGS. 7 and 8, at 810 read controller 716 reads samples 718 from memory banks 712 in multiple buffers 710 in row order. For example, referring to FIG. 8, read controller 716 reads samples 718 from the first row (row:0; addr:0000) of memory banks 712A and 712B before reading samples from the second row.

The samples corresponding to one period of the pseudonoise waveform never span more than two memory banks 712, and are never found in multiple rows of the same memory bank 712. That is, it is never necessary to read multiple addresses in a memory bank 712 to obtain all of the samples corresponding to one period of the pseudonoise waveform. All of the samples corresponding to one period of the pseudonoise waveform can be read either from the same address in both buffers 710 or from one address in one buffer 710 and an adjacent address in the other buffer 710. These reads can always take place in the same memory cycle. Therefore all of the samples corresponding to one period of the pseudonoise waveform can be read in a single memory cycle. In the example of FIG. 9, read controller 716 reads M samples from one addresses, or two address, of buffer 710. Each sample is N bits long.

At 812, integrator 720 integrates the M samples read from buffers 710, and provides a respective integration result. At 814, correlator 722 correlates the integration result with one or more reference waveforms 724. Each reference waveform 724 represents a pseudorandom number. Correlator 722 provides a correlation result for each reference waveform 724. At 816 transmitter identification module 726 determines an identity of a transmitter of GPS signal 704 based on the correlation results. For example, transmitter identification module 726 identifies the pseudorandom number used to modulate GPS signal 704 based on correlation peaks in the correlation result, and identifies the GPS transmitter using the pseudorandom number. The GPS transmitter can be a GPS satellite, a GPS pseudolite, or the like. At 818, location module 728 determines a location of digital signal processing system 700 based on the identity of the GPS transmitter. For example, location module 728 employs a pseudorange and location for the GPS transmitter to determine the location.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A system comprising:

a first memory comprising a first plurality of columns and a first plurality of rows;

a sampler configured to sample a first portion of a signal during a first plurality of periods to obtain first sets of samples, respectively, wherein the first sets of samples comprise (i) a first set having a first plurality of samples, and (ii) a second set having a second plurality of samples;

a first controller configured to write each set in the first sets of samples in a respective one of the first plurality of columns, wherein the first controller is configured to write the first plurality of samples in a first column of the first memory such that each of the first plurality of samples is stored in a respective one of the first plurality of rows, write the second plurality of samples in a second column of the first memory such that each of the second plurality of samples is stored in a respective one of the first plurality of rows, and write the second plurality of samples in the second column of the first memory subsequent to the writing of the first plurality of samples in the first column of the first memory; and a second controller configured to, subsequent to the first controller writing the first plurality of samples and the second plurality of samples in the first memory, read (i) a third plurality of samples stored in a first row of the first memory, and (ii) a fourth plurality of samples stored in a second row of the first memory.

2. The system of claim 1, wherein:

the second controller is configured to read the second row of the first memory subsequent to reading the first row of the first memory, the third plurality of samples comprises some of the first plurality of samples and some of the second plurality of samples, and the fourth plurality of samples comprises some of the first plurality of samples and some of the second plurality of samples.

3. The system of claim 1, wherein:

each sample in the first sets of samples includes a plurality of bits; and each entry in the plurality of columns stores the plurality of bits for a respective sample in the first sets of samples.

4. The system of claim 1, wherein the first controller is configured to write the first sets of samples in the first plurality of rows of the first memory according to phase such that (i) each row has a respective phase of samples, (ii) samples in each of the plurality of rows of the first memory have a same phase, and (iii) samples in different rows of the first memory have different phases.

5. The system of claim 1, further comprising an integrator configured to integrate the first sets of samples of the signal read from the first memory on a row-by-row basis to provide an integration result for each row of the first memory, wherein each of the integration results is a result of integrating samples read from entries in (i) the first plurality of columns, and (ii) a respective one of the first plurality of rows of the first memory.

6. The system of claim 5, further comprising:

a receiver configured to receive the signal from a transmitter, wherein the signal is modulated with a first waveform, and wherein the first sets of samples are of the first waveform;

a correlator configured to correlate the integration results with a second waveform, wherein the second waveform is indicative of a pseudo-random number;

an identification module configured to, based on an output of the correlator, identify the transmitter; and a location module configured to, based on the identity of the transmitter, determine a location of the system.

7. The system of claim 1, further comprising a second memory having a second plurality of columns and a second plurality of rows, wherein:

the sampler is configured to sample a second portion of the signal during a second plurality of periods to obtain second sets of samples, respectively, wherein the second sets of samples comprise (i) a third set having a fifth plurality of samples, and (ii) a fourth set having a sixth plurality of samples;

the second controller is configured to write each set in the second sets of samples in a respective one of the second plurality of columns, wherein the second controller writes the fifth plurality of samples in a first column of the second memory such that each of the fifth plurality of samples is stored in a respective one of the second plurality of rows, writes the sixth plurality of samples in a second column of the second memory such that each of the sixth plurality of samples is stored in a respective one of the second plurality of rows, and writes the sixth plurality of samples in the second column of the second memory subsequent to writing the fifth plurality of samples in the first column of the second memory; and the second controller is configured to, subsequent to the second controller writing the fifth plurality of samples and the sixth plurality of samples in the second memory, read (i) a seventh plurality of samples stored in a first row of the second memory, and (ii) an eighth plurality of samples stored in a second row of the second memory.

8. The system of claim 7, wherein:

the second controller is configured to read the second row of the second memory subsequent to reading the first row of the second memory;

the seventh plurality of samples comprises some of the fifth plurality of samples and some of the sixth plurality of samples; and the eighth plurality of samples comprises some of the fifth plurality of samples and some of the sixth plurality of samples.

9. The system of claim 8, wherein the first controller is configured to write:

the second sets of samples of the signal to the second memory subsequent to completing writing of the first sets of samples of the signal to the first memory; and subsequent to the second controller completing writing of the second portion of the signal to the second memory, third sets of samples for a third portion of the signal respectively in the first column of the first memory and the second column of the first memory.

10. The system of claim 8, wherein the second controller is configured to:

iteratively transition between (i) reading a row of the first memory and (ii) reading a row of the second memory;

during a first iteration, read a first row of the first memory followed by reading a first row of the second memory; and during a second iteration, (i) read a second row of the first memory subsequent to reading the first row of the second memory, and (ii) read the second row of the second memory subsequent to reading the second row of the first memory.

11. A method comprising:

sampling a first portion of a signal during a first plurality of periods to obtain first sets of samples, respectively, wherein the first sets of samples comprise (i) a first set having a first plurality of samples, and (ii) a second set having a second plurality of samples;

writing each set in the first sets of samples in a respective one of a first plurality of columns of a first memory, wherein the first plurality of samples are written in a first column of the first memory such that each of the first plurality of samples is stored in a respective one of a first plurality of rows of the first memory, the second plurality of samples are written in a second column of the first memory such that each of the second plurality of samples is stored in a respective one of the first plurality of rows, and the second plurality of samples are written in the second column of the first memory subsequent to the writing of the first plurality of samples in the first column of the first memory; and subsequent to writing the first plurality of samples and the second plurality of samples in the first memory, reading (i) a third plurality of samples stored in a first row of the first memory, and (ii) a fourth plurality of samples stored in a second row of the first memory.

12. The method of claim 11, wherein:

the second row of the first memory is read subsequent to reading the first row of the first memory;

the third plurality of samples comprises some of the first plurality of samples and some of the second plurality of samples; and the fourth plurality of samples comprises some of the first plurality of samples and some of the second plurality of samples.

13. The method of claim 11, wherein:

each sample in the first sets of samples includes a plurality of bits; and each entry in the plurality of columns stores the plurality of bits for a respective sample in the first sets of samples.

14. The method of claim 11, wherein the first sets of samples of the signal are written to the first plurality of rows of the first memory according to phase such that (i) each row has a respective phase of samples, (ii) samples in each of the plurality of rows of the first memory have a same phase, and (iii) samples in different rows of the first memory have different phases.

15. The method of claim 11, further comprising integrating the first sets of samples of the signal read from the first memory on a row-by-row basis to provide an integration result for each row of the first memory, wherein each of the integration results is a result of integrating samples read from entries in (i) the first plurality of columns, and (ii) a respective one of the first plurality of rows of the first memory.

16. The method of claim 15, further comprising:

receiving the signal from a transmitter, wherein the signal is modulated with a first waveform, and wherein the first sets of samples are of the first waveform;

correlating the integration results with a second waveform, wherein the second waveform is indicative of a pseudo-random number;

based on an output of the correlator, identifying the transmitter; and based on the identity of the transmitter, determining a location of the transmitter.

17. The method of claim 11, further comprising:

sampling a second portion of the signal during a second plurality of periods to obtain second sets of samples, respectively, wherein the second sets of samples comprise (i) a third set having a fifth plurality of samples, and (ii) a fourth set having a sixth plurality of samples;

writing each set in the second sets of samples in a respective one of a second plurality of columns of a second memory, wherein the fifth plurality of samples are written in a first column of the second memory such that each of the fifth plurality of samples is stored in a respective one of a second plurality of rows of the second memory, the sixth plurality of samples are written in a second column of the second memory such that each of the sixth plurality of samples is stored in a respective one of the second plurality of rows, and the sixth plurality of samples are written in the second column of the second memory subsequent to writing the fifth plurality of samples in the first column of the second memory; and subsequent to writing the fifth plurality of samples and the sixth plurality of samples in the second memory, reading (i) a seventh plurality of samples stored in a first row of the second memory, and (ii) an eighth plurality of samples stored in a second row of the second memory.

18. The method of claim 17, wherein:

the second row of the second memory is read subsequent to reading the first row of the second memory;

the seventh plurality of samples comprises some of the fifth plurality of samples and some of the sixth plurality of samples; and the eighth plurality of samples comprises some of the fifth plurality of samples and some of the sixth plurality of samples.

19. The method of claim 18, wherein:

the second sets of samples of the signal are written to the second memory subsequent to completing writing of the first sets of samples of the signal to the first memory; and subsequent to completing writing of the second portion of the signal to the second memory, third sets of samples for a third portion of the signal are written respectively in the first column of the first memory and the second column of the first memory.

20. The method of claim 18, further comprising:

iteratively transitioning between (i) reading a row of the first memory and (ii) reading a row of the second memory;

during a first iteration, reading a first row of the first memory followed by reading a first row of the second memory; and during a second iteration, (i) reading a second row of the first memory subsequent to reading the first row of the second memory, and (ii) read the second row of the second memory subsequent to reading the second row of the first memory.

* * * * *